Feb. 3, 1959    R. V. COLES, ET AL    2,871,874
CAPACITY LEVEL CONTROL WITH ADJUSTABLE SPAN CONTROL
Filed Oct. 15, 1954                                 3 Sheets-Sheet 1

INVENTORS
Ralph V. Coles, Frederick L. Maltby
and Joseph W. Philippi.
BY
Albert J. Henderson
THEIR ATTORNEY INVENTORS
Ralph V. Coles, Frederick L. Maltby
and Joseph W. Philippi.
BY
THEIR ATTORNEY United States Patent Office 2,871,874
Patented Feb. 3, 1959

2,871,874
CAPACITY LEVEL CONTROL WITH ADJUSTABLE SPAN CONTROL

Ralph V. Coles, Radnor, Pa., and Frederick L. Maltby, Riverton, and Joseph W. Philippi, Woodbury, N. J., assignors to Robertshaw-Fulton Controls Company, Greensburg, Pa., a corporation of Delaware Application October 15, 1954, Serial No. 462,422

10 Claims. (Cl. 137—392)

This invention relates to capacity level control apparatus and more particularly to a capacity type control relay having an adjustable differential control.

It is an object of this invention to control a sensitive relay by changes in capacity.

Another object of this invention is to utilize the change in capacity at a critical point for determining the position of and controlling the level of a flowable material.

Another object of this invention is to vary the levels of the critical point thereby increasing the span between the levels of the flowable material to be controlled.

Another object of this invention is to prevent the excessive wear and tear of a capacity relay apparatus by the incessant "on and off" operation of the various components.

With these and other objects in view, the invention may take the form of an oscillator circuit including an inductance and a capacitance in an oscillatory tank circuit coupled to an electron discharge tube with a source of alternating voltage for the anode of the electron discharge tube. Coupled to the oscillatory tank circuit are electrodes or plates of a capacitor probe which produce in the intervening space therebetween, an electrostatic field which may be modified by a fluid entering between the electrodes or plates. This modification of the capacitance field changes the electrical characteristics of the oscillator circuit. A work circuit including a relay is connected to the anode circuit of the discharge tube and serves to operate a pump switch when the relay is deenergized and a variable capacitor connected between the probe and the ground when it is energized. This capacitor is effectively in parallel with the capacitor probe and is coupled with the oscillatory tank circuit when the level of the control fluid reaches the desired upper level of its container and the relay is energized. Thereupon, the fluid level in the container will recede to a level to compensate for this added capacitance before the relay is again deenergized to allow more fluid to be pumped into the container.

Other objects and advantages will become apparent from the following specification taken in connection with the accompanying drawing, wherein there is shown simple embodiments of the invention for the purpose of disclosing the details of an operative device without placing limitations on the scope of the invention as defined in the appended claims.

Figure 1:
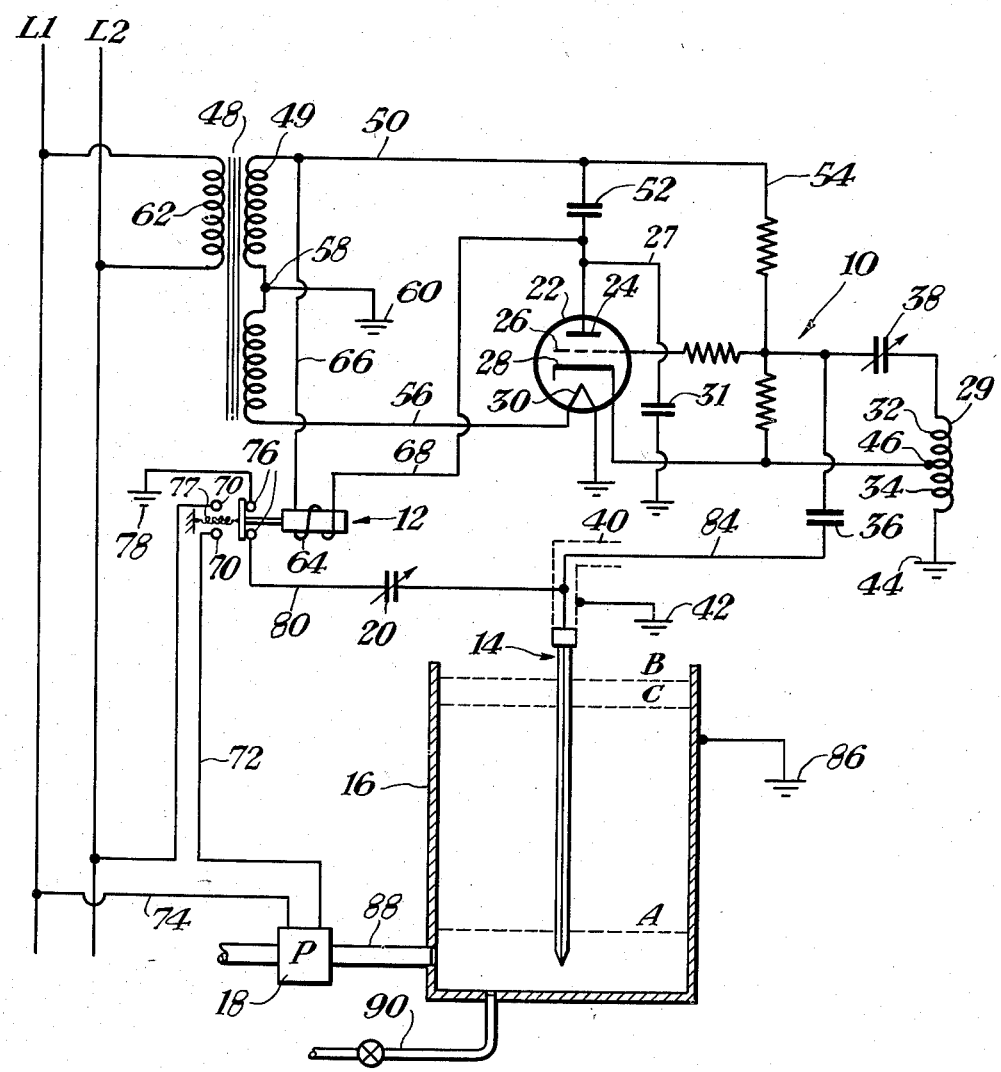
Fig. 1 is a diagrammatic illustration of a low level relay control apparatus including one of the embodiments of this invention.

Referring now to the drawing and particularly to Fig. 1, the system embodying this invention is shown as comprising an oscillator circuit 10 controlling the operation of a relay 12, a capacitor probe 14 vertically disposed within a container 16, a pump 18 for controlling the supply of flowable material in the container 16, and a variable capacitor 20 associated with the capacitor probe 14 and the relay 12 and to be more fully described hereinafter.

The oscillator circuit 10 comprises an electron discharge tube 22 having an anode 24, grid 26, cathode 28 and cathode heater 30. Coupled to the electron discharge tube 22 is an oscillatory tank circuit consisting of a coil 29 having upper and lower windings 32, 34, respectively, a variable capacitor 38 in series with the coil 29 and a capacitor 36, and the capacitor probe 14 having its shield 40 grounded at 42 thereby completing the oscillatory tank circuit to the grounded end 44 of the lower winding 34.

The electron discharge tube 22 is well known in the art and has its grid 26 connected to one side of the tank circuit between the capacitors 36 and 38. A conductor 27 connects the anode 24 through the usual feedback capacitor 29 to ground. The cathode 28 is connected to the center tap 46 between the windings 32 and 34. Current for the anode 24 is provided by a transformer 48, the secondary 49 of which is connected by a wire 50 to a capacitor 52 thence to the anode 24. The wire 50 also provides current to the grid 26 by way of wire 54. Current for the cathode heater 30 is provided by the transformer 48 through wire 56. It is to be noted that the transformer 48 is of the usual type having a tap 58 grounded at 60. Power is supplied to the above circuit from an ordinary 115 volt alternating current source (not shown) and is illustrated in the drawing by leads L1, L2 which are in turn connected to the primary 62 of the transformer 48.

The relay 12 is of the usual type having an exciter coil 64 connected by wires 66, 68 to the wire 50 which supplies the anode with current from the transformer 48. Associated with the relay is a circuit including two contacts 70, one of which is connected to the source of electric supply L2 and the other by a wire 72 to the pump 18. Another wire 74 completes the circuit by connecting the pump 18 to the lead L1 of the electrical source. The relay 12 is also associated with another circuit consisting of two contacts 76, one of which is grounded at 78, and the other being connected by a wire 80 to the variable capacitor 20 which in turn is connected to the probe wire 84. It is to be noted that the contacts 70 are normally biased closed by a spring 77 and contacts 76 normally held open when the relay 12 is deenergized and conversely when the relay is energized, the contacts 76 are held closed while contacts 70 are forced open against the bias of the spring 77.

As was previously indicated, the capacitor probe 14 and ground completes the capacitance-inductance bridge of the oscillator circuit 10. The capacitor probe forms one plate of a capacitor and is connected to the grid 26 of the electron discharge 22. Vertically immersed in the container 16, which is grounded at 86, the probe 14 acts as a variable stray capacitor depending upon the level of the fluid within the container, and serves to change the capacity of one leg of the capacitance-inductance bridge to produce a change in the oscillatory condition of the oscillator circuit 10.

The pump 18 has a pipe 88 connected thereto for supplying flowable material to the container 16 from a source (not shown). Another pipe 90 serves as a drainage for the flowable material within the container and may be directed to industrial process (not shown) for which the present invention may control.

Figure 2:
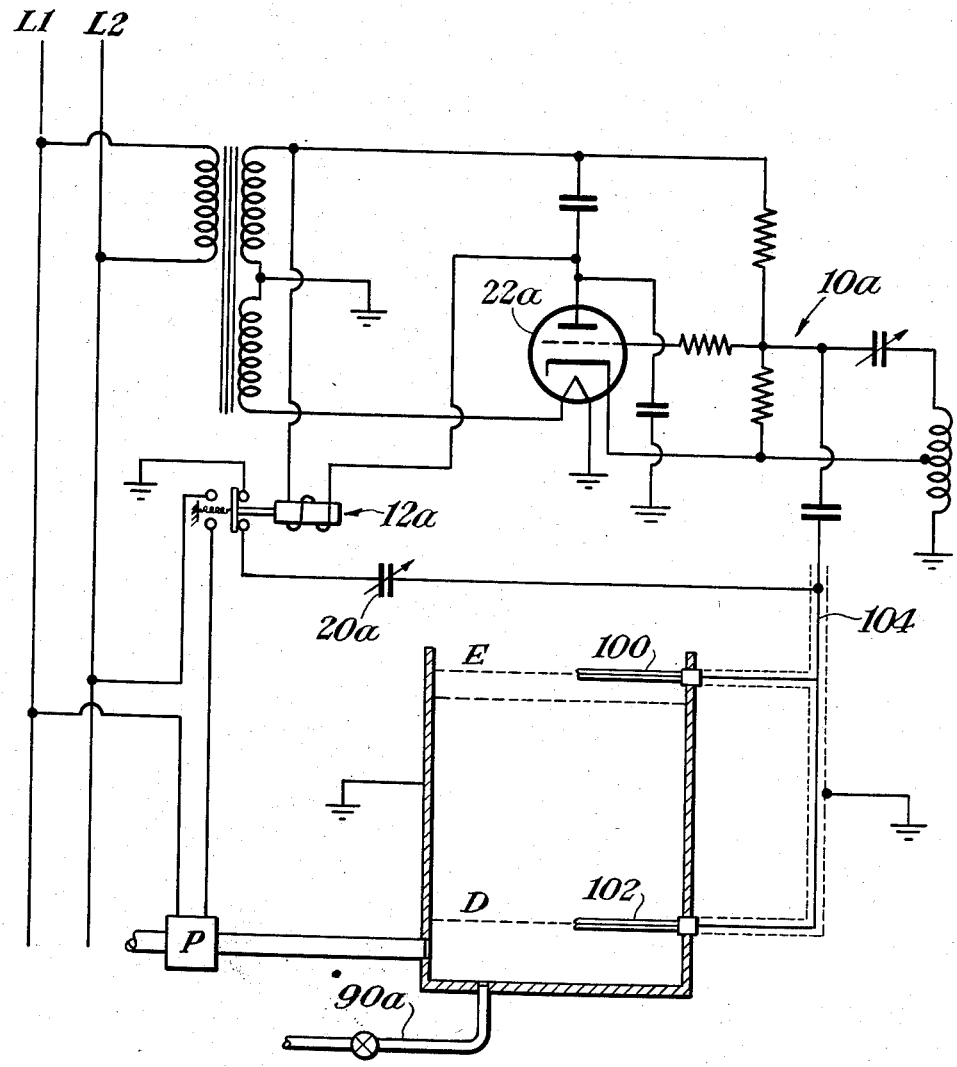
Fig. 2 is a diagrammatic illustration of a relay control apparatus of Fig. 1, showing another embodiment of the invention.

The embodiment of Fig. 2 of the invention includes the identical basic electronic circuit as shown in Fig. 1 and described above. The modification consists of substituting for the single vertically disposed capacitor probe 14 a pair of vertically spaced, horizontally disposed capacitor probes 100, 102 connected together by a wire 104 to the grid circuit of the oscillator circuit 10a.

*Operation of the embodiment of Fig. 1*

In the practical application of the embodiment of Fig. 1, assuming that leads L1, L2 are supplied with alternating current, that the anode 24 is supplied with current from the transformer 48 and that the level of the flowable material is between levels A and B of the container 16. Capacitors 36, 38 and inductance windings 32, 34 of the oscillator circuit 10 have such reactance values as to change the oscillator feedback from positive to negative when the capacitance between the probe 14 and ground has reached a certain value caused by the flowable material reaching level B. As the level of the material rises from level A toward level B and the capacitance developed between the probe 14 and ground is less than the above mentioned certain value, enough feedback exists at the grid 26 caused by the oscillatory tank circuit 10 to sustain oscillation in the discharge tube 22, which at this time is not conducting a maximum or near maximum current in the anode circuit. Therefore, the relay 12 remains deenergized, the contacts 70 closed and the circuit for the pump 18 completed. Flowable material continues to be pumped into the container 16 until the level of the material reaches level B where such a value of capacitance is developed in the capacitor probe 14 that the feedback generated at the grid 26 is insufficient to sustain oscillation, and the tube 22 becomes conductive at its maximum or near maximum rated current which is sufficient to energize relay 12 causing the opening of contacts 70 and the pump circuit and the closing of contacts 76. Closing of contacts 76 switches the variable capacitor 20 in parallel with the capacity probe 14 and its capacitance is effectively added to the capacity developed at the capacity probe 14.

Normally in devices of this general character, deenergization of a relay would only operate pump so that when the level of the material in a container recedes slightly, say to a level indicated at C in Fig. 1, the capacitance in the probe would decrease to a point where oscillation begins again thereby deenergizing the relay so that the pump is allowed to function in supplying more material to the container. The differential between these two levels has been so narrow so that the electronic circuit involved is continuously operating between oscillating and non-oscillating states, and the pump and relay experience incessant "on and off" operation such that wear and tear on the components have increased tremendously. In industrial processes where a constant regulated rate of flow of material is required, the supplying container, such as that indicated at 16 in Fig. 1, may contain any amount of material, and the only precaution necessary is to prevent the total drainage of the container.

The addition of the capacitance of the variable capacitor 20 to the capacitance of the capacity probe 14 further unbalances the oscillator circuit 10 so that the level of the material must recede still further to a point, say at A, where the decrease in capacitance in the capacitor probe 14 between levels A and B is equal to the capacitance at the variable capacitor 20. At this point, that is at level A, enough positive feedback is generated at the grid 26 to sustain oscillation whereby the relay is deenergized thus energizing the pump 18 and nullifying the effect of the variable capacitor 20 in the oscillator circuit 10. Material once again is pumped into the container 16 and the cycle is repeated.

In the embodiment shown in Fig. 2, the above discussed operation is identical. The lower level of the material is indicated at D while the upper level is shown at E and coincident with these levels are capacitor probes 102, 100 respectively. The level of material reaching upper level E induces a certain value of capacitance in the capacitor probe 100 which value will unbalance the capacitance-inductance bridge so that the discharge tube 22a will conduct enough current to energize relay 12a, thus opening the pump circuit and closing the circuit to the variable capacitor 20a. As the level of the material recedes due to industrial needs through drainage 90a, the decrease in the capacitance between the capacitor probes 100 and 102 as the level of the material lowers must equal the value of the capacitance of the variable capacitor 20a before oscillation once again is restored in the oscillator circuit 10a, and the material will be pumped to the container. It is to be noted that by varying the capacitance of the variable capacitors 20 and 20a the upper and lower levels of the material are varied since the differential between the levels is proportional to the amount of capacitance in these variable capacitors. Therefore, if the narrowest differential is desired, the variable capacitors are adjusted to effect zero capacitance and the control apparatus operates similar to one without these components. By adjusting these capacitors to a higher value, the distance between the levels increases and any distance may be selected depending upon the size and character of the container.

The above circuits are described for application to low level fail-safe control apparatus, that is, apparatus wherein upon failure of the tube 22, line voltage, or the relay 12, the closing of the pump circuit for allowing more material to enter the container 16 will be maintained. A warning signal (not shown) could be easily installed in the usual manner to indicate the malfunction of the apparatus and to close a valve (not shown) to shut down the system completely. This low level fail-safe feature is usually incorporated in the above described control apparatus for those processes which require some controlled material in a container at all times and the overflow of the material is of little consequence. However, for conditions wherein overflow is to be prevented and the complete exhaustion of the fluid from its container is of little consequence for failure of any component of the control apparatus, a high level fail-safe arrangement is possible.

Figure 3:
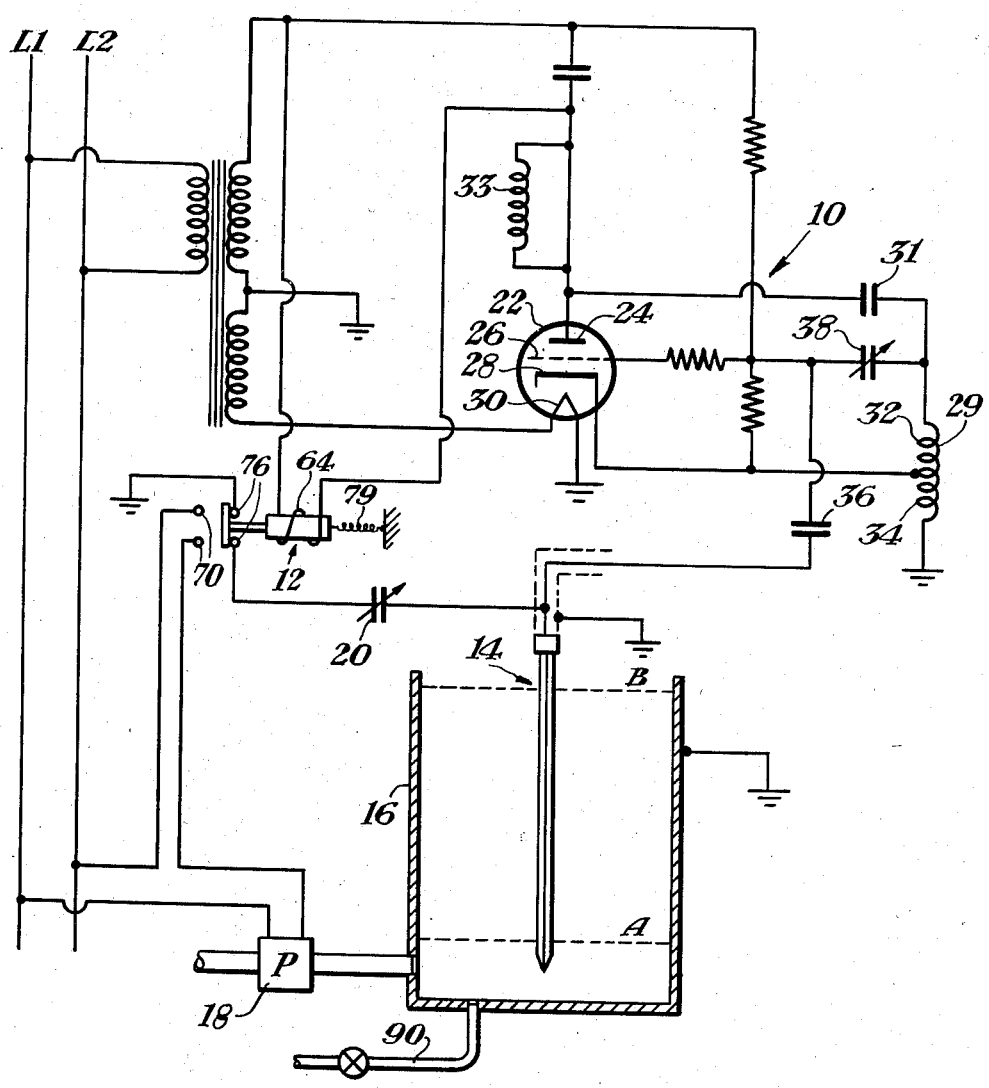
Fig. 3 is a diagrammatic illustration of a high level control apparatus including one of the embodiments of the invention.

In Fig. 3, there is shown a high level fail-safe control apparatus including the embodiment of this invention. The circuit is basically similar to that shown in Fig. 1 and similar reference numerals have been used where necessary, for corresponding parts and further description is considered unnecessary. This circuit differs from that shown in Fig. 1 by the connection of the feedback capacitor 31 to the top portion of the inductance winding 32, the inclusion of an R. F. choke 33 in the anode circuit and the reversal of the function of the relay 12, which is biased by a spring 79, so that the pump circuit is normally open.

The capacitor 31 is used to by-pass some of the R. F. energy in the anode circuit to the opposite end (with respect to the circuit of Fig. 1) of the oscillator inductance coil 29. In this way the function of the capacitance change at the probe 14 has been reversed by reversing the functions of the two inductance windings 32, 34 of the oscillator coil 29. The tube 22 will now oscillate when the probe capacitance is increased, and will stop oscillating when the capacitance at the probe 14 is decreased. The oscillator anode current is then used to energize or deenergize the control relay 12 in the same manner as previously described for the apparatus shown in Fig. 1. In the circuit diagram shown in Fig. 1, the relay 12 when deenergized serves to close the pump circuit for permitting material to enter the container 16. However, in the circuit diagram of Fig. 3, the relay 12, when deenergized permits the closing of the contacts 76 and the opening of the pump circuit under the bias of the spring 79.

*Operation of the embodiment of Fig. 3*

Assuming that the level of the fluid is below the level B, the capacitance developed in the probe 14 coupled with its effect on the oscillator circuit 10 is insufficient to maintain enough negative feedback on the grid 26 to sustain oscillation in the tube 22. Therefore, maximum or near maximum current flows in the anode circuit causing energization of the relay 12 and the closing of the circuit to the pump 18. The material continues to be pumped into the container 16 until the level of the material reaches the level B when the value of the capacitance of the probe 14 is sufficient to sustain oscillation in the tube 22 and prevent conduction thereof. With the tube 22 in this condition, the relay 12 becomes deenergized opening the contacts 70 and closing the contacts 76 for connecting the variable capacitor 20 in parallel with the probe 14. With this increased capacitance added to the capacity developed at the probe 14, the level of the material must drop to the level A in order to decrease the capacitance in the oscillator circuit 10 so that tube 22 will be able to conduct once again for energizing the relay 12 and actuate the pump 18.

In the event of failure of the tube 22, line voltage or the relay 12, the relay 12 will be deenergized for preventing flow of material in the container 16. In such event, the material is allowed to exhaust itself through the drain pipe 90 and overflow of the container 16 is prevented.

It will be apparent to those skilled in the art that many modifications of the described embodiments of this invention may be made without departing from the scope thereof which is to be measured by the appended claims.

We claim:

1. In a control apparatus for controlling the level of flowable material in a container, the combination comprising an oscillator circuit including an electron discharge tube, a source of electric current coupled to said oscillator circuit for energizing the same, a detecting device connected to said oscillator circuit being sensitive to variations in the height of said flowable material in said container for varying the conductivity of said discharge tube, means operatively connected to said discharge tube and energized in response to the conductivity of said discharge tube for controlling the supply of flowable material to said container, and a reactance element electrically connected to said detecting device by said means when said means is deenergized for varying the sensitivity of said detecting device.

2. In a control apparatus as described in claim 1 wherein said reactance element comprises a variable capacitor.

3. In a control apparatus for controlling the level of flowable material in a container, the combination comprising an oscillator circuit including an electron discharge tube, a source of electric current coupled to said oscillator circuit for energizing the same, a capacity sensitive detecting device connected to said oscillator circuit being sensitive to a predetermined height of said flowable material in said container for varying the conductivity of said discharge tube, means operatively connected to said discharge tube and energized in response to the conductivity of said discharge tube for controlling the supply of flowable material to said container, and a reactance element electrically connected to said detecting device by said means when said means is deenergized for varying said predetermined height at which the said detecting device varies the said conductivity of said discharge tube.

4. In a control apparatus as described in claim 3 wherein said reactance element comprises a variable capacitor.

5. In a control apparatus as described in claim 3 wherein said detecting means comprises a single probe vertically disposed within said container.

6. In a control apparatus as described in claim 3 wherein said detecting device comprises a pair of vertically spaced, horizontally disposed probes.

7. Apparatus for controlling the level of flowable material in a container comprising an oscillating discharge tube circuit, a reactance element, first means for connecting said reactance element in electrical engagement with said oscillating discharge tube circuit responsive to a predetermined height of said flowable material in said container, second means for disconnecting said reactance element out of electrical engagement with said oscillating discharge tube circuit responsive to another predetermined height spaced from said first named height in said container, and means for combining the electrical effects of said first means and said second means for controlling the supply of flowable material in said container.

8. Apparatus for controlling the level of flowable material in a container comprising an oscillator circuit including an electron discharge tube, first means responsive to the height of the flowable material in the container for varying the conductivity of said discharge tube between conditions of conduction and nonconduction, second means responsive to the condition of nonconduction of said discharge tube for controlling the supply of flowable material in said container, and a reactance element connected to said first means by said second means when said discharge tube is in condition of conduction for varying the conductivity of said discharge tube independently of said first means.

9. Apparatus for indicating the level of a flowable material in a container comprising circuit means having a predetermined reactance for producing a signal in response to a first level of the material in the container, and means operatively connected to said circuit and responsive to said signal for varying said reactance and conditioning said circuit means to produce a signal in response to a second level of the material in the container, said last named means being operable by said circuit to restore said predetermined reactance at said second level of the material in the container.

10. In a control apparatus for controlling the level of flowable material in a container, the combination comprising an oscillator circuit including an electron discharge tube, a source of electric current coupled to said oscillator circuit for energizing the same, a capacity sensitive detecting device disposed in the container and variable in capacitance in response to variations in the height of the flowable material therein, said detecting device being connected to said oscillator circuit for varying said discharge tube between conditions of conduction and nonconduction at a first predetermined height of the flowable material in the container, a relay circuit operatively connected to said discharge tube and including a switch operative between positions in response to variations in the conductivity of said discharge tube, means operatively connected to said switch and energized when said discharge tube is in a condition of conduction for controlling the supply of flowable material to said container, and circuit means operatively connected to said switch and energized when said discharge tube is in a condition of non-conduction for varying the capacity of said detecting device to establish a second predetermined height of the flowable material at which said discharge tube will be varied between conditions of conduction and non-conduction.

References Cited in the file of this patent

UNITED STATES PATENTS

| 2,124,018 | Vogel-Jorgensen | July 19, 1938 |
| 2,213,961 | Hunter | Sept. 10, 1940 |
| 2,635,225 | Hadady | Apr. 14, 1953 |
| 2,655,933 | Odell | Oct. 20, 1953 |
| 2,672,880 | Hermanson | Mar. 23, 1954 |
| 2,707,482 | Carter | May 3, 1955 |
| 2,763,283 | Griffith et al. | Sept. 18, 1956 |

FOREIGN PATENTS

| 663,643 | Great Britain | Dec. 27, 1951 |